(12) United States Patent
Jeter et al.

(10) Patent No.: US 8,221,024 B2
(45) Date of Patent: Jul. 17, 2012

(54) EMBEDDED MODULE FOR LINEAR SYNCHRONOUS MOTOR

(75) Inventors: Philip L. Jeter, San Diego, CA (US); Husam Gurol, Carlsbad, CA (US); In-Kun Kim, San Diego, CA (US)

(73) Assignee: General Atomics, San Diego, CA (US)

( * ) Notice: Subject to any disclaimer, the term of this patent is extended or adjusted under 35 U.S.C. 154(b) by 365 days.

(21) Appl. No.: 12/553,828

(22) Filed: Sep. 3, 2009

(65) Prior Publication Data

US 2011/0052317 A1 Mar. 3, 2011

(51) Int. Cl.
*H02K 41/03* (2006.01)

(52) U.S. Cl. .......................................... 404/71; 318/135

(58) Field of Classification Search ................ 310/12.02, 310/12.13; 404/71; 318/135; 290/1 R
See application file for complete search history.

(56) References Cited

U.S. PATENT DOCUMENTS

| | | | |
|---|---|---|---|
| 4,061,089 A | 12/1977 | Sawyer | |
| 4,217,829 A * | 8/1980 | Heidelberg | 104/281 |
| 5,473,233 A * | 12/1995 | Stull et al. | 318/587 |
| 5,628,252 A | 5/1997 | Kuznetsov | |
| 5,722,326 A | 3/1998 | Post | |
| 6,044,770 A | 4/2000 | Davey et al. | |
| 6,085,663 A | 7/2000 | Powell et al. | |
| 6,129,025 A | 10/2000 | Minakami et al. | |
| 6,510,799 B2 | 1/2003 | Lamb et al. | |
| 6,637,343 B2 * | 10/2003 | Stephan et al. | 104/295 |
| 6,651,566 B2 * | 11/2003 | Anderson et al. | 104/288 |
| 6,753,666 B2 * | 6/2004 | Fischperer | 318/135 |
| 6,827,022 B2 * | 12/2004 | van den Bergh et al. | 104/284 |
| 7,334,525 B2 * | 2/2008 | Jeter et al. | 104/124 |
| 7,567,005 B2 * | 7/2009 | Hoffmann et al. | 310/180 |
| 7,895,951 B1 * | 3/2011 | McGrath, Jr. | 104/292 |
| 8,030,888 B2 * | 10/2011 | Pandya et al. | 320/109 |
| 2003/0227269 A1 * | 12/2003 | Fischperer | 318/135 |
| 2008/0086244 A1 | 4/2008 | Jeter et al. | |
| 2010/0200316 A1 * | 8/2010 | Gurol et al. | 180/65.31 |
| 2010/0252340 A1 * | 10/2010 | Gurol et al. | 180/65.1 |

OTHER PUBLICATIONS

Cai, et al., "Dynamics, Stability, and Control of Maglev Systems," Proceedings of 13 International Conference on Magnetic Levitation and Linear Drives, Argonne National Laboratory, Argonne, IL, May 19-21, 1993, p. 265-269.

* cited by examiner

*Primary Examiner* — Gary S Hartmann
(74) *Attorney, Agent, or Firm* — Nydegger and Associates

(57) ABSTRACT

A method of constructing a roadway having an embedded linear synchronous motor (LSM) utilizes prefabricated modules. Structurally, each module comprises a top plate, a multiple-phase winding tied to the top plate, and a concrete mold encapsulating the winding. With the modules prefabricated, the roadway is constructed by first excavating a trench to position a foundation at the trench bottom. Then a mud matt is positioned on the foundation. Next, the modules are laid end-to-end on the mud matt. Thereafter, the windings in adjacent modules are electrically interconnected through joints. Further, the joints are covered by junction boxes, and the trench around the roadway is filled in with aggregate.

12 Claims, 2 Drawing Sheets

EMBEDDED MODULE FOR LINEAR SYNCHRONOUS MOTOR

FIELD OF THE INVENTION

The present invention pertains generally to methods for constructing roadways for vehicles propelled by linear synchronous motors (LSM). More particularly, the present invention pertains to the construction of such roadways utilizing pre-fabricated modules. The present invention is particularly, but not exclusively, useful as a modular system for embedding an LSM in a roadway.

BACKGROUND OF THE INVENTION

Magnetic levitation systems, often called MAGLEV systems, typically take advantage of an electromagnetic interaction between components that are mounted on a vehicle, and components that are mounted on a stationary guideway. The consequence of this interaction is to levitate the vehicle over the guideway. Propulsion of such vehicles can be provided by a linear synchronous motor (LSM) having a component mounted on the vehicle (e.g. a linear array of permanent magnets) and a component mounted on the guideway (e.g. a polyphase winding on an iron core). In combination, these LSM components interact with each other to generate electromagnetic forces to propel the vehicle along the guideway.

While MAGLEV systems provide reduced energy losses due to low friction, they typically require a dedicated vehicle with use limited to a defined guideway track or circuit. In order to provide LSM propulsion to a broader range of use, it is envisioned herein that LSM components can be provided to roadways that are accessible to automobile and truck type vehicles, i.e., vehicles that are not limited to use on a defined track. Accordingly, such vehicles will include the proper magnetic systems for interaction with the LSM components to cause propulsion of the vehicles along the roadway.

While LSM propulsion is efficient in use, it can be difficult and expensive to install. In particular, the installation of LSM propulsion must ensure proper interaction between the stationary LSM winding and vehicle-mounted magnet system.

In light of the above, it is an object of the present invention to provide a modular system for constructing a roadway having an embedded LSM winding. It is another object of the present invention to provide modules comprising a top plate, a multiple phase winding, and a mold for construction of a roadway having an embedded LSM. Yet another object of the present invention is to provide LSM modules and methods for constructing roadways from them which are easy to use, relatively simple to implement, and comparatively cost effective.

SUMMARY OF THE INVENTION

The present invention is directed to a modular system for constructing a roadway having an embedded LSM. In accordance with the present invention, the roadway includes an LSM multiple phase winding. Further, the vehicles propelled by the roadway have magnet systems that include a plurality of magnetic poles. Functionally, the linear synchronous motor is provided to produce an electromagnetic force between the winding and the magnet system to propel the vehicle along the roadway.

Structurally, each module for constructing the roadway includes a top plate. Further, the multiple phase winding is tied to the top plate. Also, a mold such as reinforced concrete encapsulates the winding to hold the winding in a configuration for interaction with the vehicle-mounted magnet systems to propel the vehicles in selected directions along the roadway.

Importantly, each module is adapted for electrical connection to an adjacent module. Specifically, the winding of each module has a proximal and distal end, and a joint connects the distal end of one winding to the proximal end of an adjacent winding.

In another aspect of the invention, the embedded LSM motor can be used for charging an electric vehicle (be it a truck, car or train). Specifically, whenever the vehicle is propelled by the LSM, an electric vehicle's batteries and/or capacitors can be charged from the thrust of the LSM motor. This energy to charge the vehicle is converted from the rolling motion of the vehicle wheels and converted into electrical energy to charge the vehicle by the use of an alternator, generator, or directly from an electric vehicle's synchronous permanent magnet motor. Once the vehicle reaches the end of the LSM powered section, the vehicle can run on its internal stored energy, performing task free of the LSM alignment. When these tasks are completed, the vehicle can return to its original starting point using the LSM powered section to transport the vehicle and once again recharge the vehicle's batteries and/or capacitors. Such a system, incorporating a similar aspect, is provided in U.S. patent application Ser. No. 12/370,172 for an invention entitled "Linear Motor Charged Electric Vehicle" which is assigned to the same assignee as the present invention.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
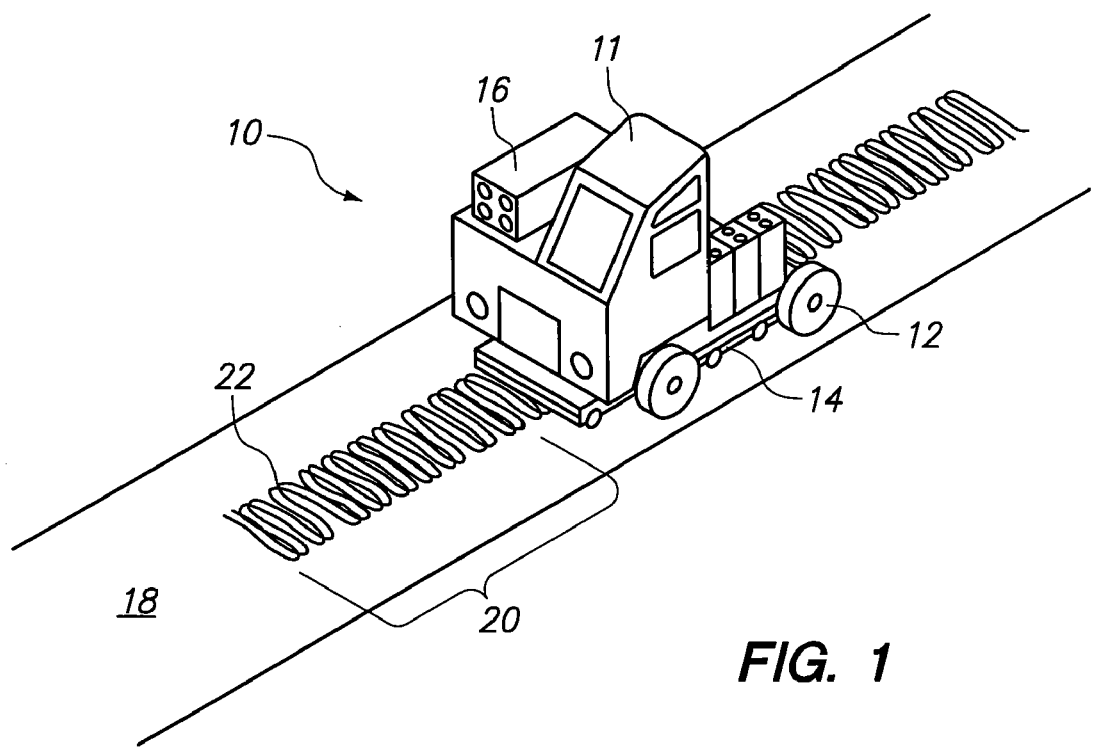
FIG. 1 is a perspective view of a vehicle traveling along a road having an embedded LSM.

Referring initially to FIG. 1, a vehicle propulsion system is shown and is generally designated 10. In FIG. 1, a wheeled vehicle 11 has a plurality of wheels 12 and includes a magnet system 14. Typically, the vehicle 11 will carry a battery 16 to propel the vehicle 11. As shown in FIG. 1, the vehicle 11 is on a roadway 18 having embedded modules 20 that hold a multiple phase winding 22. Importantly, the winding 22 receives a propulsion current to move the vehicle 11 when on the roadway 18.

Figure 2:
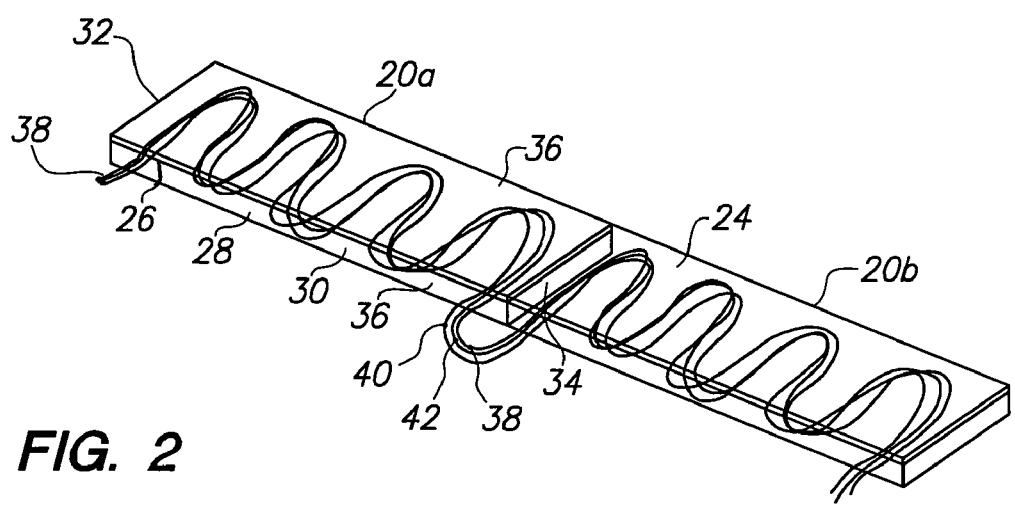
FIG. 2 is a perspective view of two modules for forming the roadway in FIG. 1.

Referring now to FIG. 2, the structure of a module 20 is more clearly illustrated. As shown, each module 20*a*, 20*b* is formed with a stainless steel top plate 24 that has a thickness of about 10 mm and an underside 26. As shown, the multiple phase winding 22 is tied to the underside 26 of the top plate 24. Further, the winding 22 is encapsulated by a mold 28 such as reinforced concrete. For concrete, the mold 28 may be considered to form a concrete beam 30. In certain embodiments, it is preferred that each beam 30 have a length of about 214.4 inches, a width of about 48 inches, and a depth of about 12 inches. Further, each beam 30 has a proximal end 32 and a distal end 34 interconnected by two sides 36.

As shown, each winding 22 enters and exits the respective module 20 through a side 36. Further, each winding 22 has a proximal end 38 and a distal end 40. As shown in FIG. 2, the distal end 40 of the winding 22 in the module 20a is electrically connected to the proximal end 38 of the winding 22 in the module 20b by a joint 42.

Figure 3:
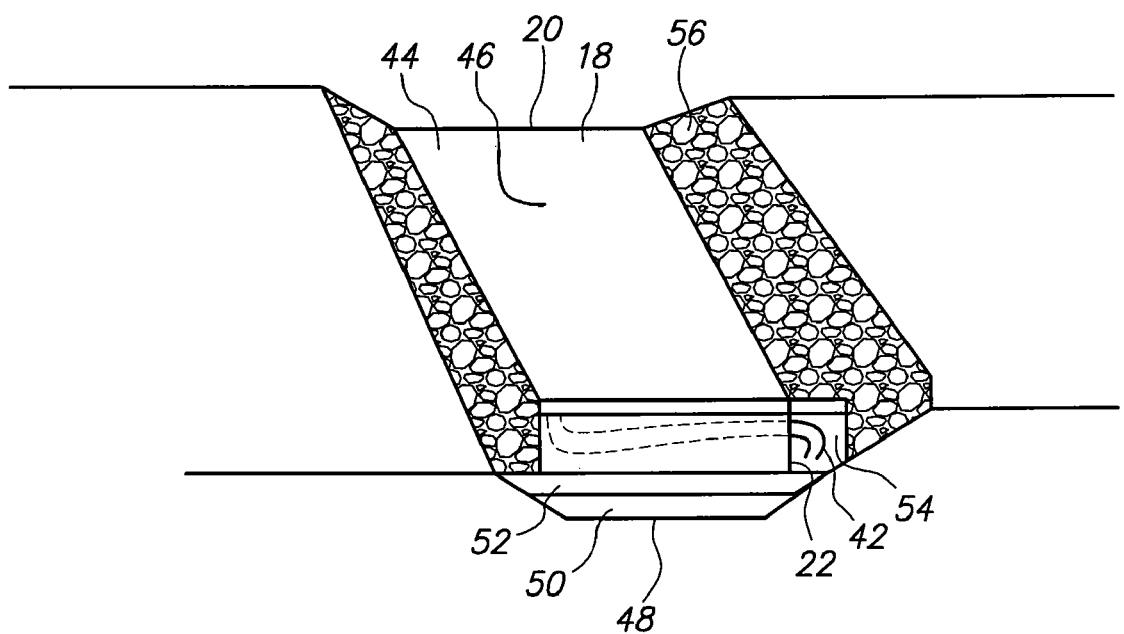
FIG. 3 is a perspective view of a module located in a trench during construction of a roadway such as that shown in FIG. 1.

Referring now to FIG. 3, a module 20 is shown installed at a location 44 to form a roadway 18. As shown, a trench 46 is excavated at the location 44, preferably with a depth of about 18 inches and a width of about 71 inches. Further, the trench 46 has a bottom 48 that includes a foundation 50. Preferably, the modules 20 are anchored to the foundation 50. On top of the foundation 50 is a mud matt 52 about 6 inches deep. As shown, the module 20 lies on the mud matt 52. As further shown, the joints 42 between windings 22 are housed by a junction box 54. Also, aggregate 56 such as gravel is used to fill the trench 46 around the modules 20.

In the method of constructing a roadway 18, the modules 20 are fabricated first. Thereafter, a trench 46 is excavated at the location 44 chosen for the roadway 18. Then the mud matt 52 is laid on the foundation 50, and the modules 20 are laid end-to-end on the mud matt 52. The windings 22 from adjacent modules 20 are electrically connected at the joints 42, and then the joints 42 are covered with the junction boxes 54. In certain embodiments, the electrical connection is performed by welding the respective windings 22 together by a high temperature reaction of powdered copper oxide and aluminum in a semi-permanent graphite mold. Lastly, the trench 46 is filled in with aggregate 56. As a result, a roadway 18 is constructed using modules 20 having embedded multiple phase windings 22.

While the particular Embedded Module for Linear Synchronous Motor as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A method of constructing a roadway having an embedded linear synchronous motor (LSM) which comprises the steps of:
   fabricating a plurality of modules having proximal ends and distal ends, with each module being fabricated by tying a multiple phase winding to a top plate and by thereafter encapsulating the winding with a mold by constructing a frame to define an open cavity around the top plate and thereafter pouring concrete into the open cavity and onto the top plate to form a concrete beam bounded by the top plate to hold the winding in a configuration for interaction with a magnet system mounted on a vehicle to propel the vehicle in a selected direction along the roadway;
   preparing a location for the roadway;
   aligning the modules end-to-end to construct the roadway; and
   electrically connecting the windings of adjacent modules through joints.

2. A method as recited in claim 1 wherein the electrical connection between windings of adjacent modules is performed by welding ends of the respective windings together.

3. A method as recited in claim 2 wherein the welding action is performed by a high temperature reaction of powdered copper oxide and aluminum in a semi-permanent graphite mold.

4. A method as recited in claim 1, wherein the concrete beam has a length of about 214.4 inches, a width of about 48 inches, and a depth of about 12 inches.

5. A method for constructing a roadway having an embedded linear synchronous motor (LSM) which comprises the steps of:
   fabricating a plurality of modules having proximal ends and distal ends, with each module being fabricated by tying a multiple phase winding to a top plate and by thereafter encapsulating the winding within a mold to hold the winding in a configuration for interaction with a magnet system mounted on a vehicle to propel the vehicle in a selected direction along the roadway;
   preparing a location for the roadway including the sub-steps of:
      excavating a trench, with a foundation positioned at the bottom of the trench;
      installing wayside cables in the trench;
      positioning a mud matt on the foundation;
   aligning the modules end-to-end to construct the roadway; and
   electrically connecting the windings of adjacent modules through joints.

6. A method as recited in claim 5 further comprising the steps of:
   housing the joints in junction boxes; and
   filling the trench around the modules with aggregate.

7. A method as recited in claim 5 further comprising the step of anchoring the modules to the foundation.

8. A method as recited in claim 5 wherein the mud matt is 6 inches deep.

9. A method as recited in claim 5 wherein the trench is about 18 inches deep and about 71 inches wide.

10. A method of constructing a roadway having an embedded linear synchronous motor (LSM) which comprises the steps of:
    fabricating a plurality of modules having proximal ends and distal ends, with each module being fabricated by tying a multiple phase winding to a top plate and by thereafter encapsulating the winding with a mold to hold the winding in a configuration for interaction with a magnet system mounted on a vehicle to propel the vehicle in a selected direction along the roadway;
    excavating a trench, with a foundation positioned at the bottom of the trench;
    positioning a mud matt on the foundation;
    lying the modules end-to-end on the mud matt to construct the roadway; and
    electrically connecting the windings of adjacent modules through joints.

11. A method as recited in claim 10 wherein the electrical connection between windings of adjacent modules is performed by welding ends of the respective windings together by a high temperature reaction of powdered copper oxide and aluminum in a semi-permanent graphite mold.

12. A method as recited in claim 10 wherein the encapsulating step is performed by constructing a frame to define an open cavity around the top plate and thereafter pouring concrete into the open cavity and onto the top plate to form a concrete beam bounded by the top plate.

* * * * *